United States Patent Office 3,257,349
Patented June 21, 1966

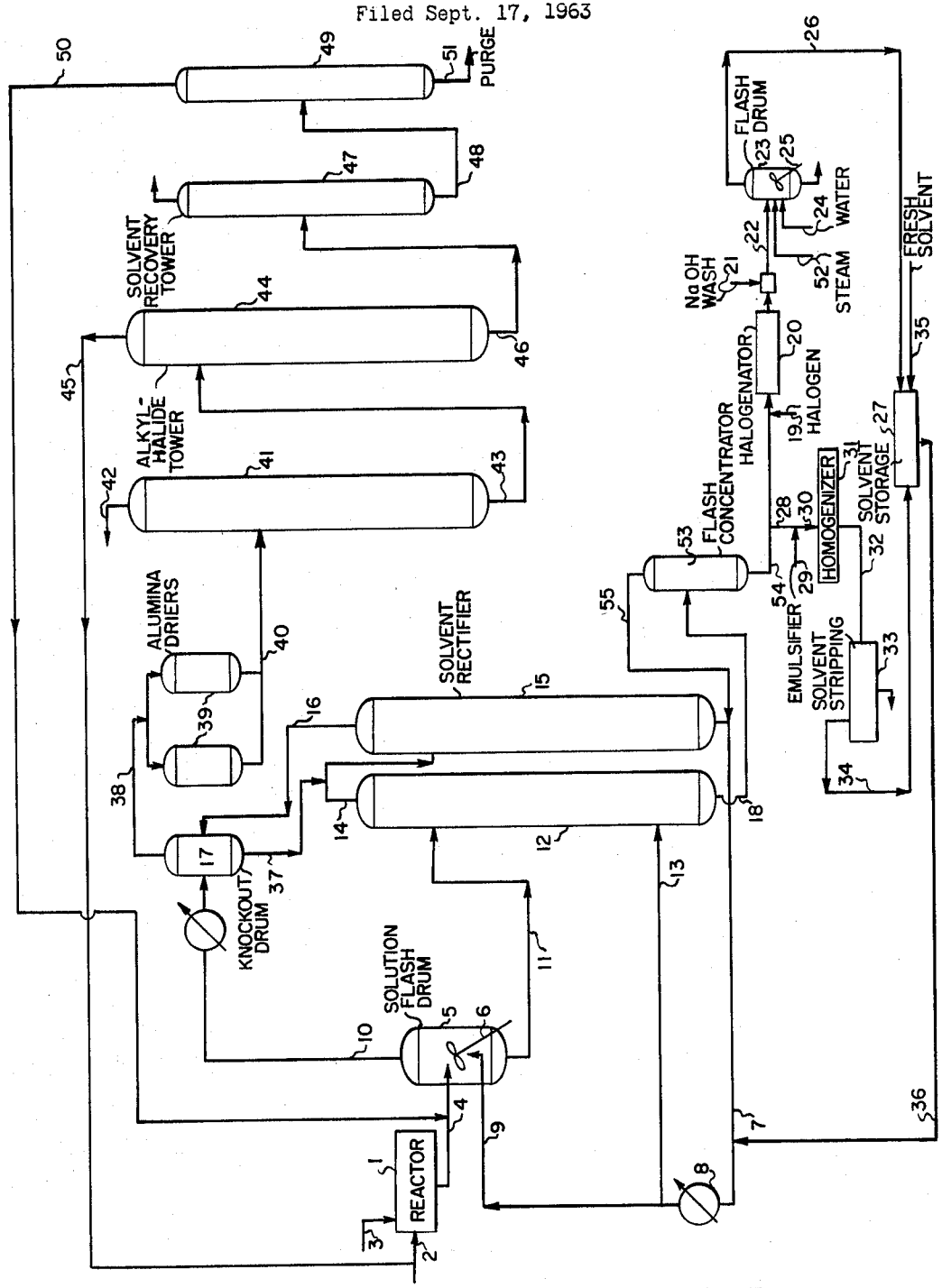

3,257,349
PURIFYING RECYCLE STREAMS IN INTEGRATED PROCESS FOR PREPARING HALOGENATED BUTYL RUBBER AND BUTYL RUBBER LATEX
James Augustus Johnson, Jr., and Edwin Duane Luallin, Baton Rouge, La., assignors to Esso Research and Engineering Company, a corporation of Delaware
Filed Sept. 17, 1963, Ser. No. 309,440
2 Claims. (Cl. 260—29.7)

The present invention relates to an improved method for preparing halogenated butyl rubber and butyl rubber latex and more particularly relates to improvements in an integrated process for preparing halogenated butyl rubber and butyl rubber latex wherein undesirable materials are removed from recycle streams, the presence of which would degrade the products obtained in the integrated process.

Copolymers of an olefin, preferably an isoolefin, and a multiolefin, such as a triolefin, and/or an unconjugated multiolefin and especially those in which isobutylene is combined with a conjugated diolefin are referred to in the literature as "Butyl Rubber" or GR–I rubber (Government Rubber-Isobutylene).

The expression "Butyl Rubber" as employed herein is defined to include a copolymer of about 60 to 99.5% of an isoolefin of about 4 to 8 carbon atoms, e.g., isobutylene, and about 40 to 0.5% of a conjugated multiolefin of about 4 to 14 carbon atoms and preferably about 4 to 8 carbon atoms, e.g., butadiene or preferably isoprene. However, any equivalents of such vulcanizable copolymers such as above disclosed or other known equivalents are intended to be within the purview of the present invention.

Butyl rubber, as referred to in the prior art and made by such processes as the processes of U.S. Patents Nos. 2,356,128; 2,384,975; 2,399,672; 2,418,912; 2,607,764; 2,821,515 and equivalent processes as disclosed in other patents and in the literature, is ideally suited for premium grade rubber tire treads.

In the usual commercial process the monomers, e.g., isoprene and isobutylene, are polymerized in about 1 to 7 volumes of a non-aqueous diluent, such as an alkyl halide, particularly methyl chloride or other lower halo-alkane at a temperature between −90 and −200° C., preferably between −50 and −103° C. using a Friedel-Crafts catalyst such as aluminum chloride dissolved in an alkyl halide diluent. This slurry is then caused to flow into a flash zone where it is contacted with steam and water to remove volatile materials and to re-slurry the polymer in aqueous suspension. This aqueous slurry is passed through a vibrating screen or rotary filter to separate the bulk of the water and leave the polymer in the form of wet crumb containing 10% to 30% water. This wet crumb is usually passed through a tunnel drier or through a series of extruders or both to completely remove all the water and occluded gases.

In the preparation of halogenated butyl rubber and of butyl rubber latex, the butyl rubber must first be dissolved in a hydrocarbon solvent to form a solution known as "cement." By passing the effluent from a butyl rubber reactor into a flash zone containing warm hydrocarbon solvent instead of water to remove unreacted monomers and diluent alkyl halide, a solution or cement can be prepared and this step can easily be integrated into a process for continuously preparing halogenated butyl rubber and butyl latex by sending any desired portion of the cement to each of these steps.

It is known that the presence of unsaturated compounds in the hydrocarbon solvent used to prepare the cement adversely affects the quality of the final products. Such unsaturated compounds, if present in the solvent, will be halogenated preferentially over the polymer and thereby consume excess halogen. A sizeable portion of these halogenated compounds remain in the final halogenated polymer and give a misleading indication of the amount of halogen combined in the polymer. This may lead to a rubber with physical properties which do not meet specifications. In addition, these halogenated compounds, particularly the bromo compounds, are lachrymators and their presence causes difficulties during finishing operations and in subsequent compounding of the finished polymer. Other portions of these halogenated compounds remain with the solvent and contaminate the cement from which they find their way into the latex formed from a portion of the cement. When the latex is concentrated at elevated temperatures these compounds tend to hydrolyze and release hydrogen halide. This lowers the pH of the latex and increases the inorganic halide ion concentration which renders the latex unstable.

These unsaturates have generally been considered to be unreacted monomers, e.g., isobutylene and isoprene, as well as hexenes present in the hexane solvent used. These unreacted monomers are easily removed by carefully stripping the cement before using it to prepare halogenated butyl rubber or butyl rubber latex. The presence of unsaturated compounds in the solvent introduced into the system can be controlled by pretreating the solvent to remove any unsaturated compounds before it is introduced to the system.

In spite of these precautions, however, it was not found possible to remove all of the unsaturates from the integrated system. In this system the effluent from the butyl rubber reactor is introduced into a flash drum containing warm hydrocarbon solvent, e.g., hexane. This results in the unreacted hydrocarbon raw materials, e.g., isobutylene and isoprene and diluent methyl chloride or other alkyl halide being flashed off overhead from the drum. At the same time the solution of butyl rubber polymer in solvent is withdrawn from the bottom of the drum and sent to a series of two stripping concentration towers from the second of which solvent vapor is removed overhead and combined with the overhead from the drum. This combined overhead is compressed, dried, and fed to a series of distillation towers from the first of which a high purity fraction of methyl chloride is taken overhead and used to prepare fresh catalyst solution. The bottoms from the first tower are then sent to the upper portion of the second distillation tower from which the remainder and main portion of methyl chloride diluent is taken off overhead and recycled to the polymerization zone. The bottoms from this tower are then passed to the midsection of a third tower from which the unreacted monomers, e.g., isobutylene and isoprene are removed overhead and hydrocarbon solvent is removed from the bottom and recycled to the flash drum.

It has now been discovered, and this forms the basis for the present invention, that some of the unreacted monomers, particularly the isobutylene, is polymerized to low boiling polymers of isoolefin or multiolefin or both, mostly to di-isobutylene in the third fractionation tower and hence is not removed overhead but remains dissolved in the solvent and hence passed throughout the system with the solvent, thus contaminating both the halogenated products and the latex.

In accordance with this invention the above difficulties are overcome and the unsaturated polymers removed from the solvent being recycled by subjecting the solvent being recycled to an additional fractionation step whereby substantially pure solvent is taken overhead from the fractionation zone and the polymer is removed from the fractionation zone as a bottoms fraction.

The details and advantages of the invention will be better understood from a consideration of the drawing which is a diagrammatic representation of an integrated process for preparing halogenated butyl rubber and butyl rubber latex, employing the method of this invention for removing the high-boiling unsaturated polymers from the recycle solvent. Referring now to this drawing:

A polymerizable feed comprising an admixture of about 60 to 99.5 weight percent (e.g., 98 weight percent) of a $C_4$ to $C_8$ isoolefin such as isobutylene of at least 98% purity (e.g., 99% purity) and about 0.5 to 40 weight percent (e.g., 2.0 weight percent) of a $C_4$ to $C_{14}$ conjugated multiolefin such as isoprene of at least about 90% purity (e.g., 95% purity) is continuously charged to reactor 1 via conduit 2 along with about 1 to 5 volumes (e.g., 3 volumes) of a $C_1$ to $C_3$ alkyl halide such as methyl chloride. Simultaneously, a solution of a Friedel-Crafts catalyst dissolved in a $C_1$ to $C_3$ alkyl halide (e.g., 0.2 weight percent of aluminum chloride in methyl chloride) is charged to reactor 1 via conduit 3. The concentration of the catalyst is maintained in the reactor at between about 0.01 to 0.50 weight percent and preferably betwen about 0.05 to 0.20 weight percent (e.g., 0.10 weight percent) based on total monomers by suitable regulation of the catalyst concentration and rate of addition. The conversion of monomers to rubbery copolymer is maintained at about 50 to 90% and preferably at about 70 to 80% (e.g., 75%) by controlling the above feed to catalyst ratio. The polymer product quality is controlled by maintaining the polymerization temperature at a level of between about $-80°$ to $-120°$ C. (i.e., $-120°$ to $-180°$ F.) and preferably between about $-90°$ and $-107°$ C. (i.e., $-130°$ to $-160°$ F.), e.g., $-95°$ C. (i.e., $-140°$ F.). The reaction is carried out either under vacuum, pressure or atmospheric conditions, the general range advantageously being from about 10 to about 250 p.s.i.a. (e.g., 30 p.s.i.a.), the pressure being preferably regulated to a level of between about 5 and 50 p.s.i. above the pressure in flash drum 5 (e.g., a pressure of 10 p.s.i. above the pressure in the flash drum).

After completion of the reaction, a slurry of about 15 to 30 weight percent, preferably about 17 to 25 weight percent (e.g., 18 weight percent) of butyl rubber in methyl chloride is then overflowed from reactor 1 via conduit 4 to flash drum 5 which is fitted with an agitator 6. Flash drum 5 is maintained as will appear hereinafter, at a temperature level sufficiently high to vaporize the methyl chloride diluent and generally at a pressure of between about 5 and 50 p.s.i. below the pressure in reactor 1. For instance, flash drum 5 is advantageously operated at temperatures of between about 0° and 250° F., preferably between about 80° and 120° F. (e.g., 100° F.) and at pressures of between about atmospheric pressure and 200 p.s.i.g. (e.g., 5 p.s.i.g.). Simultaneously a superheated $C_5$ to $C_{10}$ hydrocarbon or mixture of such hydrocarbons (e.g., hexane) is injected in vapor form into flash drum 5 via conduit 9. More particularly, hexane in liquid form is conveyed through conduits 7 and 36 into vaporizer-superheater 8 where the hexane is vaporized and superheated to 300° F. This superheated vapor is then passed through line 9 into flash drum 5 wherein the hexane vapor condenses giving off sufficient heat to volatilize methyl chloride which is driven off overhead via conduit 10 as more fully described hereinafter.

The hydrocarbon solvent such as hexane may contain about 0 to 500 parts per million and especially 30 to 100 parts per million of water (e.g., 50 parts per million of water), i.e., sufficient water to deactivate the catalyst. Alternatively, a small amount of an oxygenated hydrocarbon such as an alcohol (e.g. isopropanol) or water may be either blended with the solvent vapor or injected directly into flash drum 5 to prevent "after polymerization." As beforementioned, the flash drum is maintained at a lower pressure than the pressure in the reactor. This is to force the slurry of butyl rubber copolymer in the methyl chloride from the reactor to the flash drum.

The temperature and pressure in flash drum 5 are regulated whereby to flash off a sufficient amount of methyl chloride diluent via conduit 10 to cause the butyl rubber copolymer to dissolve at a rapid rate in the hydrocarbon solvent such as hexane. About 70 to 100% (e.g., 85%) of the methyl chloride is generally removed. The butyl rubber dissolved in hexane is then withdrawn via conduit 11.

The dissolved butyl rubber copolymer is withdrawn via line 11 and introduced near the top of a 20 to 50 plate (e.g., 25 plates) polymer stripping column 12 wherein the polymer solution passes down the column countercurrent to upwardly rising solvent vapors, preferably supplied to the bottom of the column from vaporizer-superheater 8 via conduit 13. The solvent vapors are superheated to a temperature insufficient to cause thermal degradation of the polymer, generally up to not more than about 50° F. superheat.

Solvent vapors containing unreacted monomers and alkyl halide diluent, if any, are removed overhead through line 14 and passed into the upper part of tower 15 from which a small amount of solvent vapor and all the unreacted monomers and alkyl diluent is taken overhead through line 16 and introduced into knockout drum 17. Bottoms from tower 15 consisting of solvent free of unreacted monomers and alkyl halide is passed to vaporizer 8 through line 7.

The essentially olefin-free polymer solution withdrawn from the bottom of tower 12 through line 18 is passed to flash drum 53 maintained at a pressure substantially lower than the pressure in polymer stripping column 12 (e.g., atmospheric pressure) whereby cooling and concentration simultaneously occur due to the evaporation of a portion of the solvent which is removed overhead through line 55 and returned to line 7 for recycling in the system. Concentrated polymer solution (cement) is withdrawn from the bottom of flash zone 53 by line 54 and mixed with either bromine or chlorine introduced through line 19 and halogenated in halogenation unit 20. Any hydrogen halide formed as a result of the halogenation is neutralized by caustic solution introduced through line 21. The halogenated product is passed by line 22 into flash drum 23. The formation of a water slurry of halogenated butyl rubber copolymer is accomplished in this drum by the addition of high pressure steam through conduit 52 and recirculated water through conduit 24 facilitated by the use of an agitator 25. This flash drum is desirably operated at about 180° F. and 15 p.s.i.g. The solvent is recovered from flash drum 23 by line 26 and passed to hexane storage 27.

A portion of the cement flowing in line 54 is withdrawn through line 28 and mixed with an aqueous solution of an emulsifier introduced through line 29. Any suitable emulsifier may be used but the organic sulfates disclosed in the Brodkey et al. Patents Nos 2,955,094 and 2,936,295 are particularly suitable. These sulfates are used in amounts of about 0.5 to 10 parts by weight per 100 parts by weight of polymer, preferably between 2 and 5 parts by weight per 100 parts of polymer. The resulting mixture is passed by line 30 to homogenizing zone 31 where it is emulsified with water in any type of equipment which gives violent agitation such as a colloid mill, a Dispersator, a Waring Blendor or the like. A particularly suitable type of equipment has been found to be a sonic mixer known as the Rapisonic homogenizer. This consists of a gear pump which forces the materials through an orifice and impinges the stream on a knife-edge vibrating blade, encased in a resonating bell. The energy of vibration is obtained from the force of the stream striking the blade. The resulting emulsion is then passed by line 32 to solvent stripping zone 33 where the solvent is removed through line 34 and sent to storage 27. Make up solvent is introduced to the system through line 35. Recycle solvent is sent from storage to vaporizer-superheater 8 by line 36.

Returning now to flash drum 5, unreacted monomers, alkyl diluent and solvent vapors removed through line 10 are cooled and passed to knockout drum 17 from which any condensate is passed by line 37 to solvent tower 15. Vapors from knockout drum 17 including solvent vapors introduced through line 16 are passed by line 38 to alumina driers 39, then by line 40 to tower 41. This tower is so operated that a pure alkyl halide stream is removed overhead through line 42 and recycled to catalyst make up drum (not shown). A bottoms fraction consisting of alkyl halide and solvent is removed by line 43 and passed to the top of tower 44 from which an overhead alkyl halide stream is recycled to reactor 1 by line 45. Bottoms from tower 44 are passed by line 46 to tower 47 from which unreacted monomers, e.g., isobutylene and isoprene are purged from the system. As described above, the conditions in this tower (namely temperatures in excess of 300° F.) and the relatively high hold-up time in the fractionation system towers and surge drums are such that a portion of the monomers, mainly isobutylene, is polymerized and this polymer dissolves in the solvent and is removed as bottoms from the tower by line 48. In order to effect removal of this polymer, the bottoms are passed to tower 49. The bulk of the solvent is removed overhead by line 50 and recycled to flash drum 5. The polymers are removed as bottoms through line 51 and purged from the system.

The above description shows that the present invention affords a simple means of removing undesirable unsaturated materials from the recycle solvent in an integrated process for the preparation of halogenated butyl rubber and butyl latex.

The nature of the present invention having been thus fully set forth, what is claimed as new and useful and desired to be secured by Letters Patent is:

1. In an integrated process, for copolymerizing a mixture of 60 to 99.5 wt. percent of a $C_4$ to $C_8$ isoolefin and 0.5 to 40 wt. percent of a $C_4$ to $C_{14}$ conjugated multiolefin to form a copolymer, dissolving said copolymer in a hydrocarbon solvent to form a solution, chlorinating a portion of said solution and emulsifying another portion of said solution, in which
  (a) the monomers are polymerized in the presence of a Friedel-Crafts catalyst and an alkyl halide diluent to form a slurry of copolymer in said diluent,
  (b) said slurry is introduced into a flash zone containing hydrocarbon solvent to form a solution of copolymer in solvent and remove a stream of alkyl halide diluent, unreacted monomers, and a minor amount of said solvent,
  (c) said copolymer solution is fractionated to remove an overhead stream containing the remaining unreacted monomers and alkyl halide diluent and some solvent and is then flashed to form a concentrated solution of copolymer, separating said concentrated solution of copolymer into two portions, chlorinating one portion and emulsifying the other portion to form a latex,
  (d) the overhead stream removed from the copolymer solution by the fractionation step, containing unreacted monomers, alkyl halide diluent, and solvent is combined with said stream of alkyl halide diluent and unreacted monomers, and a minor amount of said solvent,
  (e) the combined stream is fractionated to separate alkyl halide diluent and unreacted monomers from hydrocarbon solvent during which fractionation some low-boiling isoolefin and multiolefin polymers form and remain with the hydrocarbon solvent,
  (f) and the hydrocarbon solvent is recycled to the said flash zone, the method for preventing the formation of undesirable chlorinated polymers and unstable latex due to contamination of the hydrocarbon solvent present by the low-boiling polymers which comprises fractionating the said hydrocarbon solvent to form a substantially pure hydrocarbon solvent and a fraction containing substantially all of the low-boiling polymers of isoolefin and multiolefin and recycling only the substantially pure hydrocarbon solvent to the flash zone.

2. In an integrated process, for copolymerizing a mixture of 60 to 99.5 wt. percent of isobutylene and 0.5 to 40 wt. percent of isoprene to form a copolymer, dissolving said copolymer in a hexane to form a solution, chlorinating a portion of said solution and emulsifying another portion of said solution, in which
  (a) the monomers are polymerized in the presence of aluminum chloride and a methyl chloride diluent to form a slurry of copolymer in said diluent,
  (b) said slurry is introduced into a flash zone containing hexane to form a solution of copolymer in hexane and remove a stream of methyl chloride diluent, unreacted monomers, and a minor amount of said hexane,
  (c) said copolymer solution is fractionated to remove an overhead stream containing the remaining unreacted monomers and methyl chloride diluent and some hexane and is then flashed to form a concentrated solution of copolymer, separating said concentrated solution of copolymer into two portions, chlorinating one portion and emulsifying the other portion to form a latex,
  (d) the overhead stream removed from the copolymer solution by the fractionation step, containing unreacted monomers, methyl chloride diluent, and hexane is combined with said stream of methyl chloride diluent and unreacted monomers, and a minor amount of said hexane,
  (e) the combined stream is fractionated to separate methyl chloride diluent and unreacted monomers from hexane during which fractionation some isobutylene and isoprene polymers form and remain with the hexane,
  (f) and the hexane is recycled to the said flash zone, the method for preventing the formation of undesirable chlorinated polymers and unstable latex due to contamination of the hexane present by the low-boiling polymers which comprises fractionating the said hexane to form a substantially pure hexane and a fraction containing substantially all of the low-boiling polymers of isobutylene and isoprene and recycling only the substantially pure hexane to the flash zone.

References Cited by the Examiner

UNITED STATES PATENTS 2,940,960  6/1960  Tegge et al. _____ 260—29.7
2,965,620  12/1960 Serniuk et al. _____ 260—29.7

MURRAY, TILLMAN, *Primary Examiner.*

J. ZIEGLER, *Assistant Examiner.*